United States Patent [19]
Berns

[11] Patent Number: 4,798,109
[45] Date of Patent: Jan. 17, 1989

[54] MACHINE FOR FORMING A CHAMFERED EDGE ON A WORKPIECE

[76] Inventor: Joseph F. Berns, 1171 Georgia Lane, Cincinnati, Ohio 45215

[21] Appl. No.: 100,013

[22] Filed: Sep. 23, 1987

[51] Int. Cl.⁴ .............................................. B23B 3/00
[52] U.S. Cl. ..................................... 82/2 R; 82/4 C; 82/2.5; 82/24 R; 82/45; 408/80
[58] Field of Search ................. 408/81, 82, 83, 80, 408/104, 110, 111, 112; 29/1.32; 82/35, 20, 45, 2.5, 2 R, 4 C, 4 A, 4 B, 4 D, 4 E, 24, 25

[56] References Cited

U.S. PATENT DOCUMENTS

| | | | |
|---|---|---|---|
| 790,735 | 5/1905 | Martin | 408/110 |
| 2,173,530 | 9/1939 | Blazek | 82/45 |
| 2,389,857 | 11/1945 | Kayfetz | 408/104 |
| 2,448,305 | 8/1948 | Girard | 82/35 |

Primary Examiner—Frederick R. Schmidt
Assistant Examiner—Blynn Shideler
Attorney, Agent, or Firm—James W. Pearce; Roy F. Schaeperklaus

[57] ABSTRACT

A machine for forming a chamfer on an edge portion of a cylindrical workpiece. The machine includes a table, a chuck mounted on the table for holding the workpiece and track means mounted on the table and extending parallel to the axis of the chuck. A carriage runs on the track means. A motor is carried by the carriage. A cutter head is driven by the motor. Cutter blade means mounted on the cutter head forms a chamfer on the workpiece as the carriage and the cutter head are advanced.

4 Claims, 4 Drawing Sheets

MACHINE FOR FORMING A CHAMFERED EDGE ON A WORKPIECE

BACKGROUND OF THE INVENTION

This invention relates to a machine for forming a chamfered edge on a workpiece.

An object of this invention is to eliminate sharp edges at the chamfered edge.

BRIEF STATEMENT OF THE INVENTION

Briefly, this invention provides a machine which includes a first portion which holds a workpiece in a selected position and a second portion which carries rotatable cutter means. A mount for the second portion supports the second portion for advancing axially of the workpiece into position to form a circumferential chamfer on an end portion of the workpiece. Guide rings on the portions interact to guide the cutter as the chamfer is cut.

BRIEF DESCRIPTION OF THE DRAWINGS

The above and other objects and features of the invention will be apparent to those skilled in the art to which this invention pertains from the following detailed description and the drawings, in which:

FIG. 7 is a fragmentary view looking in the direction of the arrows 7—7 in FIG. 6, only a single cutter blade and associated parts being shown;

In the following detailed description and the drawings, like reference characters indicate like parts.

DESCRIPTION OF PRESENTLY PREFERRED EMBODIMENT

Figure 1:
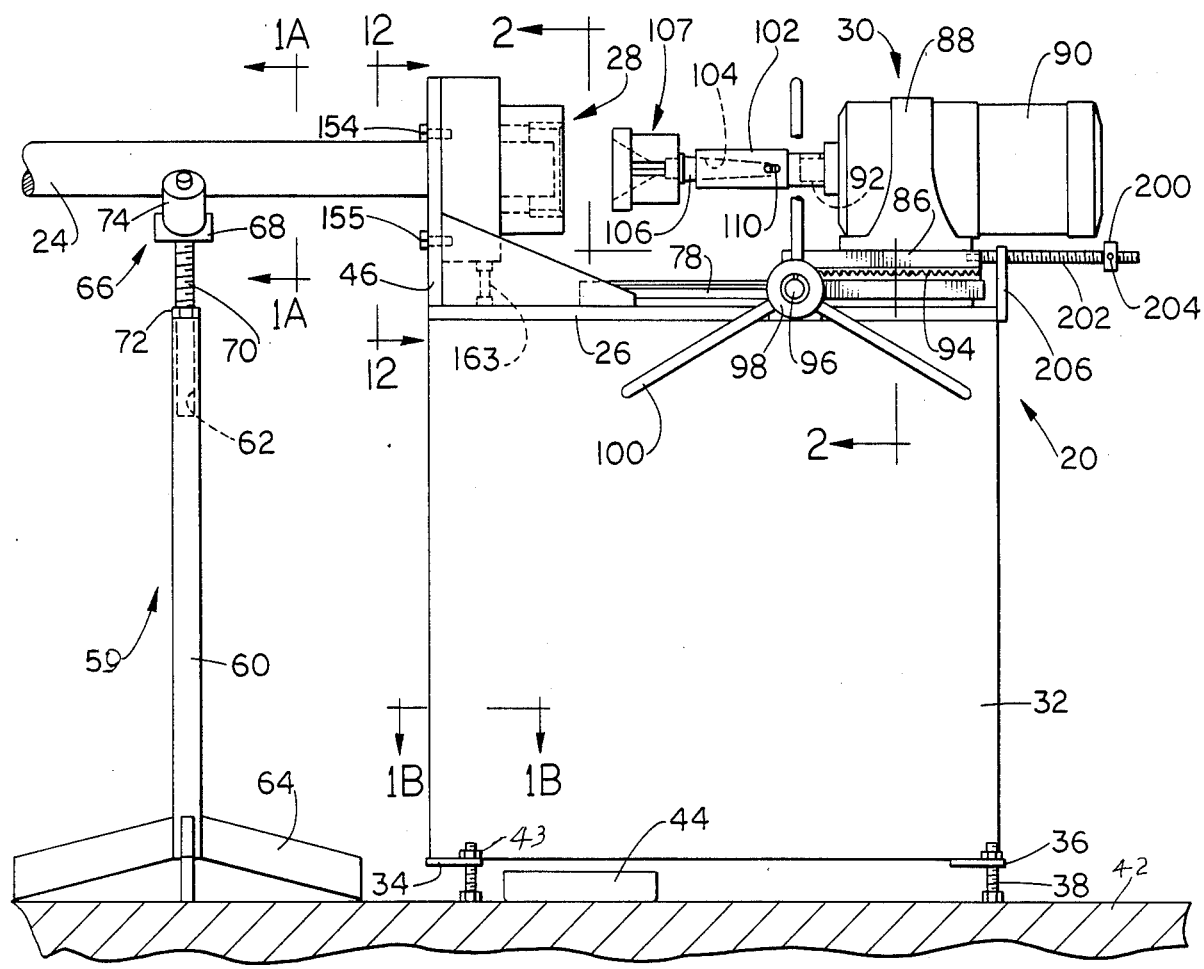
FIG. 1 is a view in side elevation of a machine for forming a chamfer on a workpiece, which is constructed in accordance with an embodiment of this invention, a supporting floor being shown in section.

In FIG. 1 is shown a machine 20 for forming a chamfered edge 21 on an end portion 22 of a cylindrical workpiece 24, which is constructed in accordance with an embodiment of this invention.

A table 26 supports a chuck assembly 28 and a cutter assembly 30 of the machine 20. The table 26 is carried on a box frame base 32. The box frame base 32 is carried by plate supports 34 and 36. Support bolts 38 threaded in upright openings 40 (FIG. 1B) in the plate supports 34 and 36 rest on a floor 42. Lock nuts 43 hold the bolts 38 in position. A chip pan 44 can be mounted on the floor 42 beneath the box frame base 32.

An upright plate 46 is mounted on the table 26 and supports the chuck assembly 28, not shown in detail, with a selected section of the end portion 22 of the workpiece 24 exposed in a cavity 49 of a guide ring 56 of the chuck assembly 28. The workpiece 24 extends through an opening 50 (FIG. 12) in the upright plate 46 and an opening 51 (FIG. 2) in the chuck assembly 28. Bolts 153, 154 and 155 extend through upright slots 158, 159 and 161, respectively, in the upright plate 46 to hold the plate 46 and the chuck assembly 28 in assembled relation. The chuck assembly includes a housing 52 having radial slots 53 in which jaws 54 move to grip a cylindrical face 55 of the workpiece 24 to hold and center the workpiece in the chuck housing 52. The housing 52 of the chuck assembly 28 is supported by a bolt 163 which is threaded in the table 26 with the chuck housing 52 resting on a head 165 of the bolt 163. A lock nut 167 holds the bolt 163 in position. The guide ring 56 is mounted on the chuck housing 52 by means of bolts 57. A guide bushing 58 is mounted on an inner face of the guide ring 56.

Figure 1A:
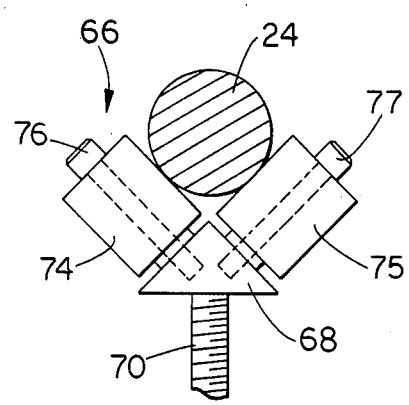
FIG. 1A is a fragmentary view in section taken on a line 1A—1A in FIG. 1 on an enlarged scale.
Figure 1B:
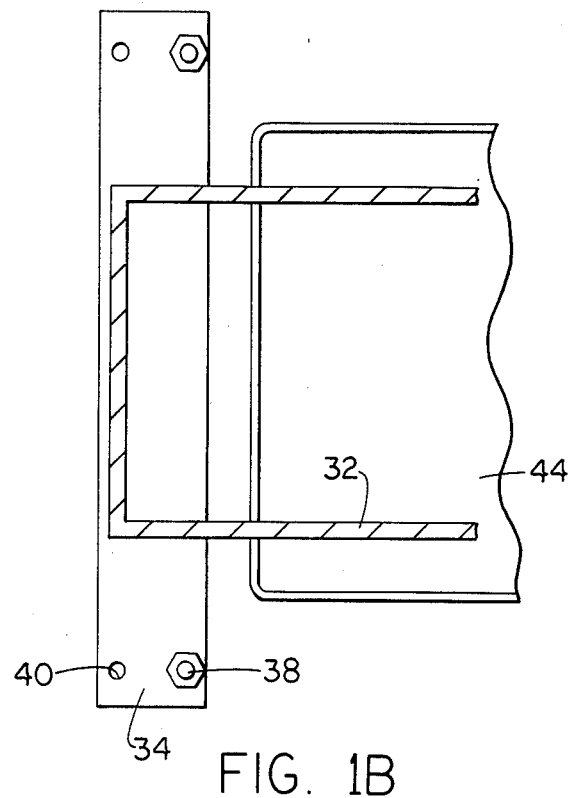
FIG. 1B is a fragmentary view in section taken on the line 1B—1B in FIG. 1.

The workpiece 24 can be elongated and can be supported by one or more bar stands 59, one of which is shown in FIGS. 1 and 1A. The bar stand 59 includes a vertical member 60 having an upright threaded opening 62 at an upper end thereof. Legs 64 attached to the vertical member 60 adjacent a lower end thereof hold the vertical member 60 in upright position. A roller assembly 66 is supported on the vertical member 60. The roller assembly 66 includes a block 68 and a shaft 70 attached to the block 68. The shaft 70 is threaded in the opening 62. A nut 72 locks the roller assembly 66 in position. Rollers 74 and 75 are rotatably mounted on bolts 76 and 77, respectively. The bolts 76 and 77 in turn are mounted in the block 68. The rollers 74 and 75 support the workpiece 24.

Tracks 78 and 80 (FIG. 2) are mounted on the table 26 and extend parallel to the axis of the chuck assembly 28 and the workpiece 24. Track followers 82 and 84 travel on the tracks 78 and 80, respectively. The track followers 82 and 84 support a carriage plate 86, which supports a motor support harness 88. The harness 88 carries a motor 90. The motor 90 drives a motor shaft 92. A rack bar 94 is mounted on a lower face of the carriage plate 86 in mesh with a pinion 95. The pinion 95 is carried by a shaft 96. The shaft 96 is rotatably mounted in a bearing member 97. The bearing member 97 is supported on the table 26. A wheel 98 is mounted on the shaft 96. Handles 100 mounted on the wheel 98 can be used to turn the wheel 98 to advance and retract the carriage plate 86 and the motor 90.

A hollow adapter member 102 is mounted on the motor shaft 92. The hollow adapter member 102 has a tapered cavity 104. The tapered cavity 104 receives a tapered shaft portion 106 of a cutter head assembly 107. A slot 110 in the hollow adapter member 102 permits entry of a tool (not shown) for causing release of the shaft portion 106 from the tapered cavity 104 of the hollow adapter member 102. The shaft portion 106 has a threaded tip 112 at one end thereof. The threaded tip can be received in a threaded opening 113 in a base portion 115 of a tool body 116.

The tool body 116 includes tooth-shaped supports 120 which are integral with and extend from the base portion 115. Slots 122 are formed in the tool body 116 between the tooth-shaped supports 120. Each tooth-shaped support has a wall 123 facing one of the slots 122 on which a cutter 124 is mounted. A cutter clamp 126 holds the cutter 124 in position on the associated wall 123. The cutter clamp 126 includes an arm 128 which overlies and engages an arm 130 of the associated cutter 124. Bolts 132 and 134 extend thrugh openings 136 and 137, respectively, in the wall 123 and are threaded in openings 138 and 140, respectively, in the cutter clamp 126 to hold the cutter 124 in position extending at an acute angle of approximately 30 degrees to the axis of the tool body 116. A ring 150 is mounted on edge portions of the tooth-shaped supports 120 in a circumferential slot 151 in the tooth-shaped supports 120. The ring 150 engages slots 152 in the cutter clamps 126. The outer diameter of the ring 150 is slightly less than the inner diameter of the bushing 58 of the guide ring 45 so that the ring 150 can just slide inside the ring 56 and the bushing 58.

Figure 2:
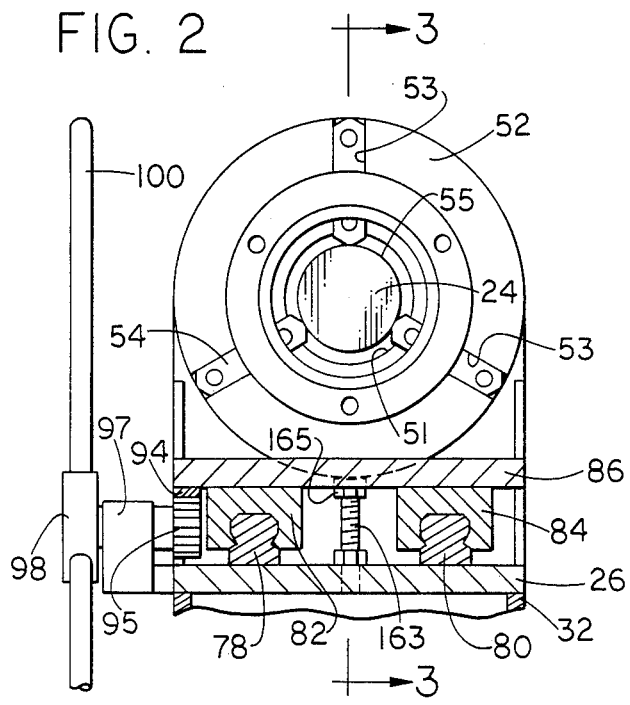
FIG. 2 is a view in section taken on an enlarged scale on the line 2—2 in FIG. 1.
Figure 3:
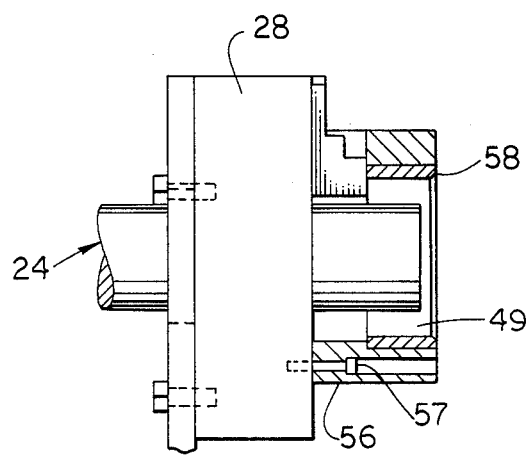
FIG. 3 is a view in section taken on an enlarged scale on the line 3—3 in FIG. 2.
Figure 12:
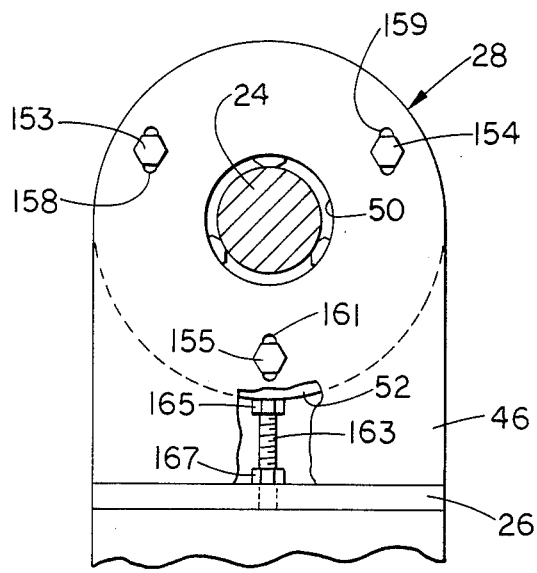
FIG. 12 is a view in section taken on the line 12—12 in FIG. 1.
Figure 12A:
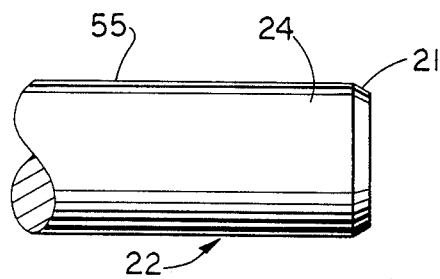
FIG. 12A is a fragmentary view in side elevation of the workpiece after a chamfer has been formed thereon.
Figure 4:
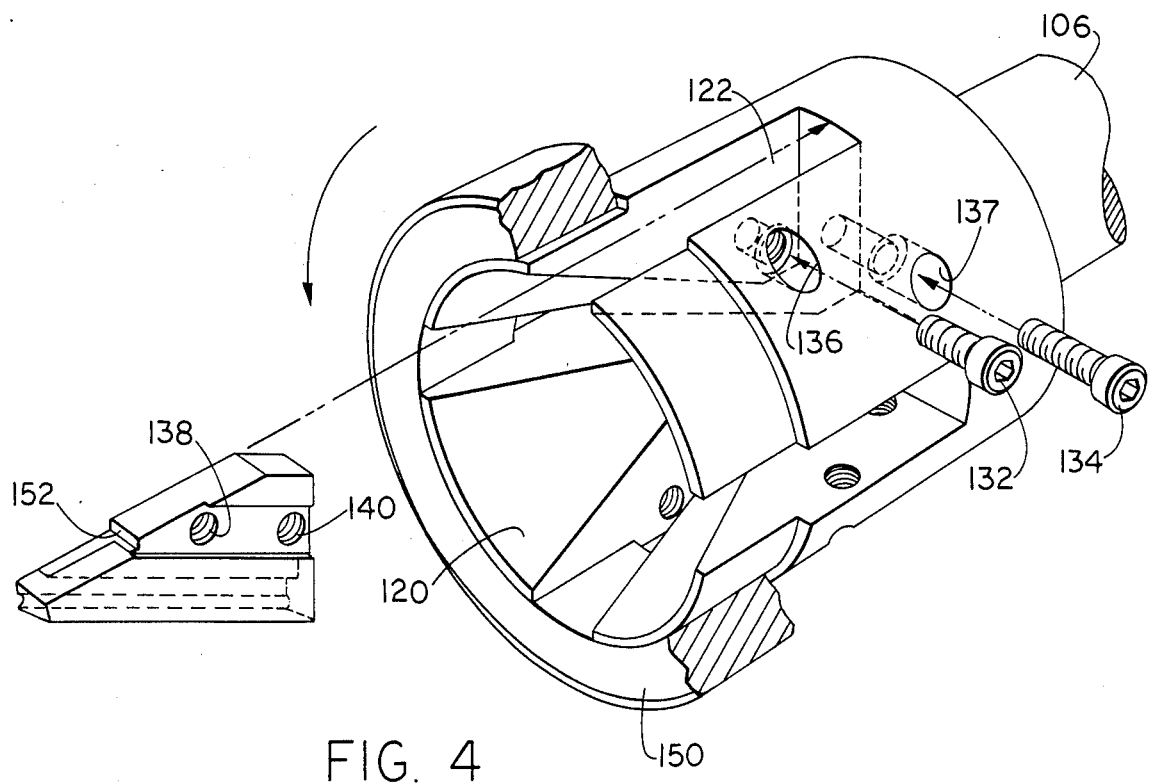
FIG. 4 is a perspective view on an enlarged scale, partly broken away and in section, some parts being exploded as indicated in double dot-dash lines showing a cutter head of the machine.
Figure 5:
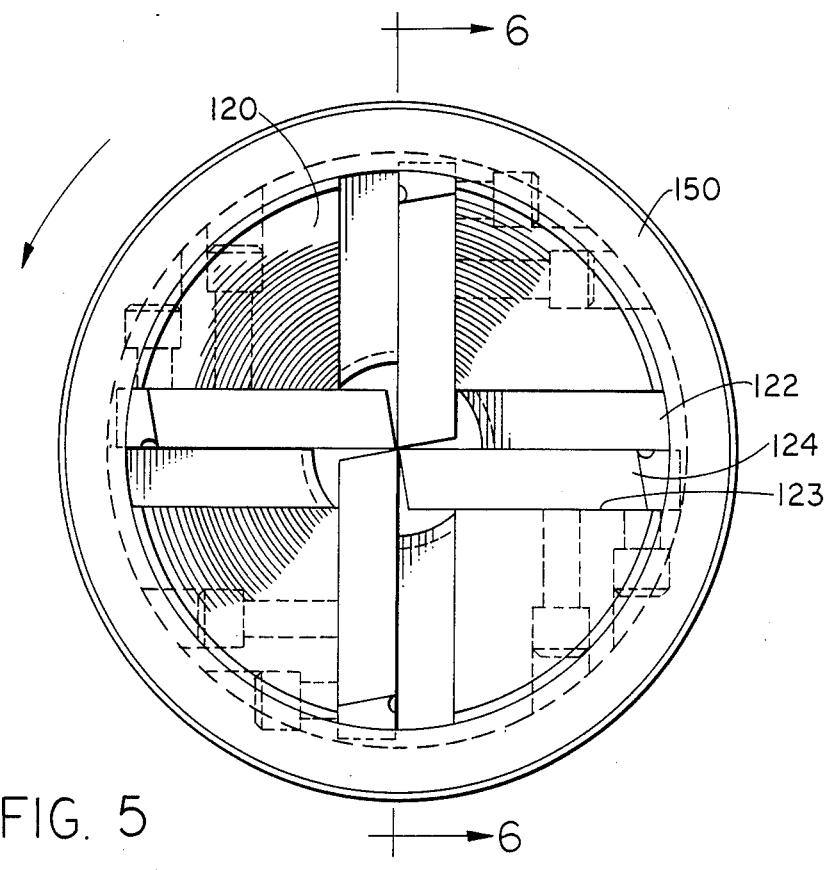
FIG. 5 is a view in end elevation of the cutter head.
Figure 6:
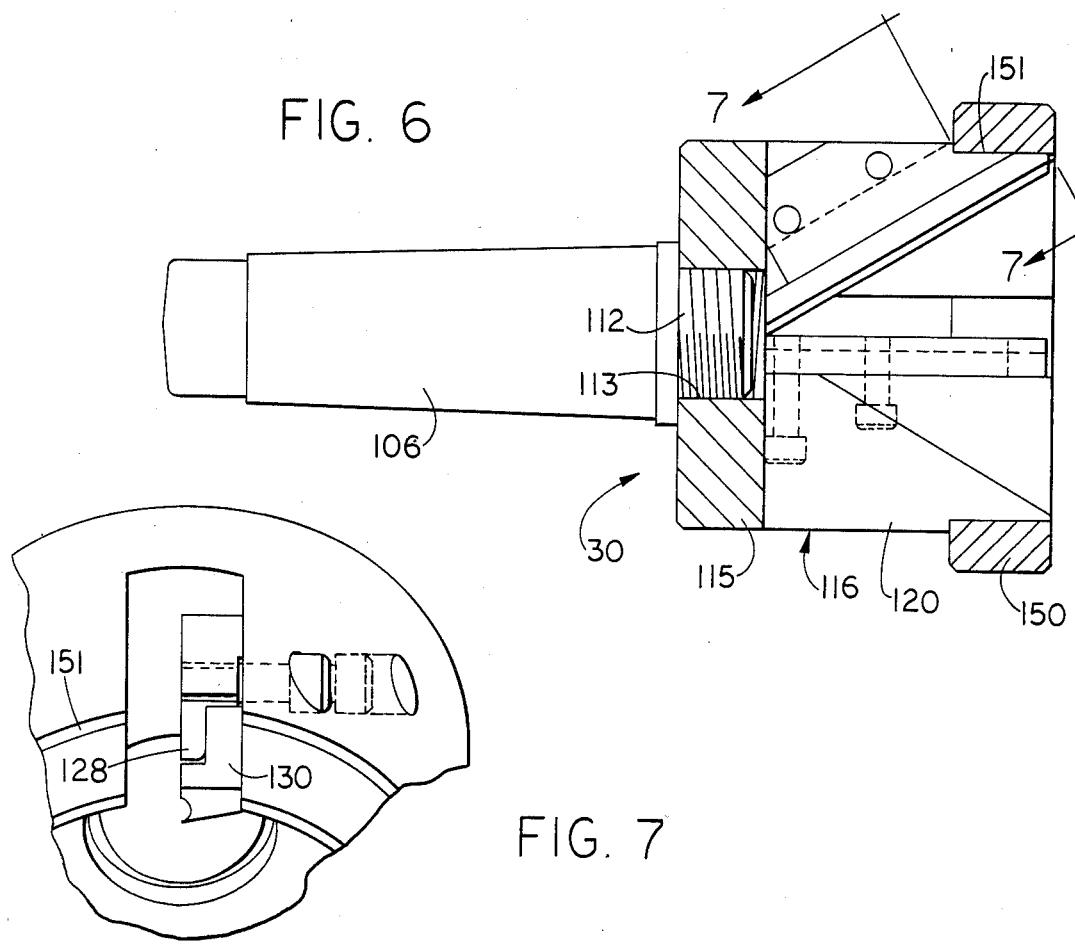
FIG. 6 is a view in section of the cutter head taken on the line 6—6 in FIG. 5.
Figure 8:
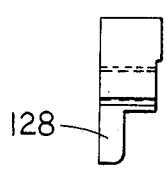
FIG. 8 is a view in end elevation of a clamp bar of the machine.
Figure 9:
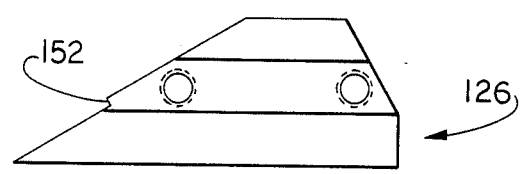
FIG. 9 is a view in front elevation of the clamping bar shown in FIG. 8.
Figure 10:
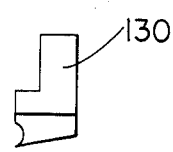
FIG. 10 is a view in end elevation of a cutter bar of the machine.
Figure 11:
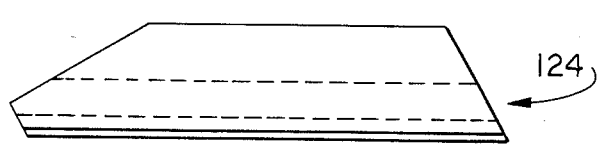
FIG. 11 is a view in front elevation of the cutter bar.

When the machine is to be used, the workpiece 24 is mounted in the machine as shown in FIGS. 1, 2, and 12. The motor 90 is energized by action of an appropriate switch and circuitry (not shown) to cause rotation of the cutter assembly 30. Then the wheel 98 is turned to advance the carriage plate 86 and the cutter assembly 30 to bring the cutters into position to form the chamfered edge 21 on the workpiece 24 as shown in FIG. 12A. The rings 150 and 56 and the guide bushing 58 serve to align the chuck assembly 28 with the cutter assembly 30. A stop nut 200 threaded on a rod 202 is locked in position thereon by a set screw 204. The rod 202 is mounted on the carriage 86 and engageable with a stop arm 206, which is mounted on the table 26 to limit advance of the cutter assembly 30.

The machine for forming a chamfer on an edge of a workpiece is subject to structural modification without departing from the spirit and scope of the appended claims.

Having described my invention, what I claim as new and desire to secure by Letters Patent is:

1. A machine for forming a chamfer on an end portion of a workpiece which comprises a table, a chuck having an axis and mounted on the table for holding a selected portion of the workpiece in symmetrical relation to said axis with an end portion of the workpiece supported in position for chamfering, track means mounted on the table and extending parallel to the axis of the chuck, a carriage running on the track means, a motor carried by the carriage, a cutter head driven by the motor, cutter blade means mounted on the cutter head, the axis of the cutter head being aligned with the axis of the chuck, a first guide ring on the chuck, a second guide ring on the cutter head, the first and second guide rings being engageable for maintaining axes of the cutter head and the chuck in alignment as the carriage moves, and means for moving the carriage, the motor and the cutter head toward the chuck whereby the cutter blade means forms a chamfer on the workpiece having an axis coincident with the aligned axes of the cutter head and the chuck.

2. A machine as in claim 1 in which the inner face of one of the guide rings is substantially aligned with the outer face of the other of the guide rings for holdings the chuck and the cutter head in alignment as the cutter head cuts the chamfer on the workpiece.

3. A machine as in claim 1 in which the cutter blade means extends at an acute angle to the axis of the cutter head.

4. A machine as in claim 3 in which the angle is approximately 30 degrees.

* * * * *